April 23, 1940.  I. E. MATHER  2,198,454
MOTION PICTURE CAMERA
Filed Aug. 15, 1938
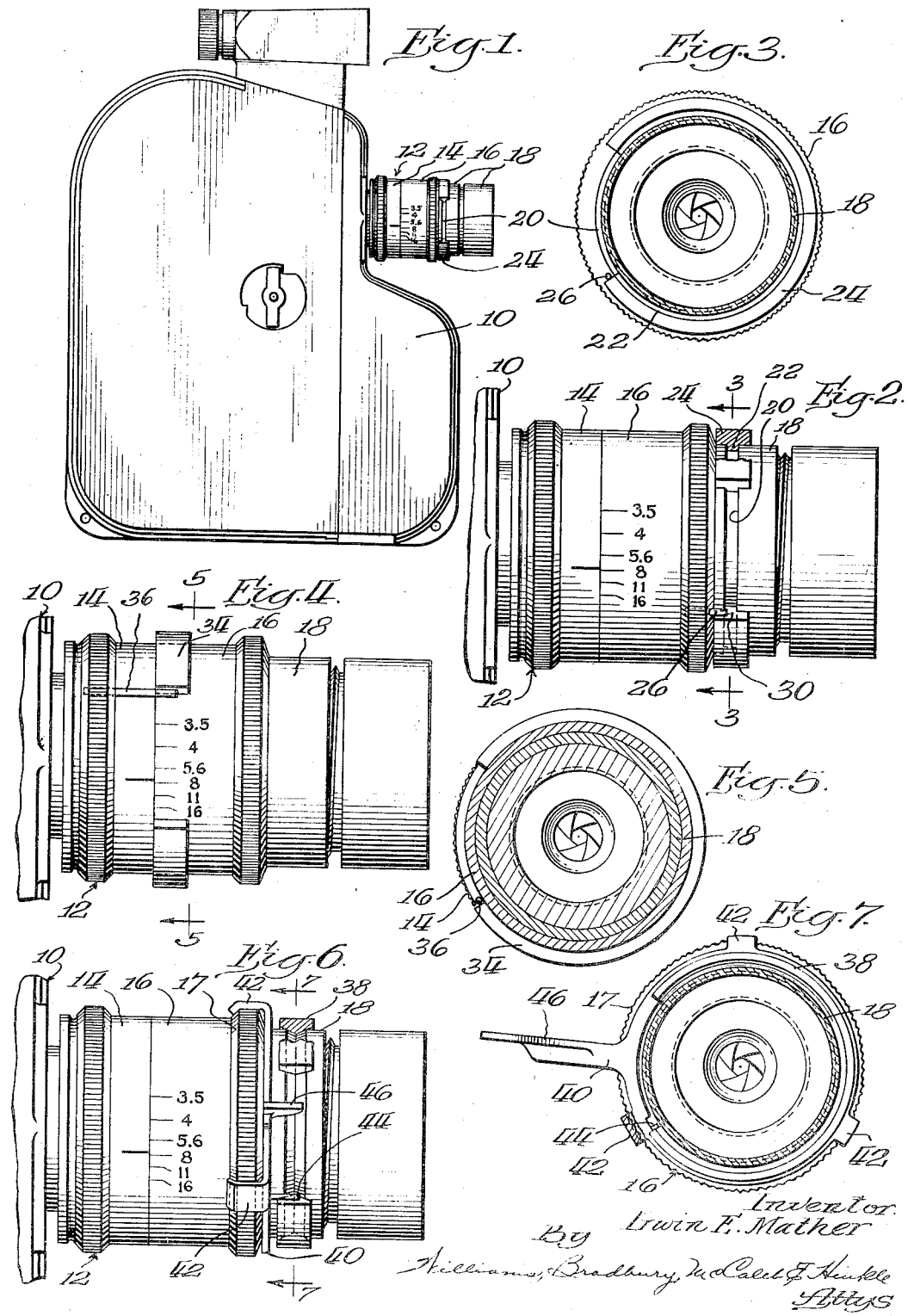
Inventor
Irwin E. Mather
By Williams, Bradbury, McCaleb & Hinkle
Attys Patented Apr. 23, 1940

2,198,454

UNITED STATES PATENT OFFICE 2,198,454

MOTION PICTURE CAMERA

Irwin E. Mather, Chicago, Ill.

Application August 15, 1938, Serial No. 224,856

4 Claims. (Cl. 95—64)

My invention relates generally to motion picture cameras and more particularly to an improved attachment for cameras of this type for providing for the gradual increase and gradual decrease of the amount of light admitted to the camera at the beginning and end of a particular scene to eliminate sudden changes in the degree of illumination when the resultant scenes are successively projected.

In professional motion picture work it is the common practice to provide "fade-ins" and "fade-outs" whereby at the beginning of a particular scene the degree of illumination is increased gradually, and similarly, at the end of the scene, the degree of illumination is decreased gradually. In this way, when the resultant film is projected, the transition from one scene to another is gradual in so far as the light intensity is concerned, and the eyes of the audience are thus spared the undesirable sudden change in the degree of illumination which would otherwise occur as each new scene of a different degree of brightness than the preceding scene is projected upon the screen.

It is thus an object of my invention to provide a simple and improved apparatus whereby "fade-in" and "fade-out" effects may be procured in the use of amateur motion picture cameras.

A further object is to provide a simple device which may be attached to so-called "home movie" cameras which will enable the user to obtain "fade-in" and "fade-out" effects.

Other objects will appear from the following description, reference being had to the accompanying drawing, in which Figure 1 is a side elevation view of a conventional amateur motion picture camera incorporating my invention;

Figure 2 is an enlarged elevational view of the lens housing of the camera;

Figure 3 is a transverse sectional view taken on the line 3—3 of Figure 2;

Figure 4 is an enlarged elevational view of a modified form of the invention;

Figure 5 is a trans-sectional view taken on the line 5—5 of Figure 4;

Figure 6 is a side elevation of a second modified form of my invention; and

Figure 7 is a transverse sectional view taken on the line 7—7 of Figure 6.

While various means for securing "fade-in" and "fade-out" effects in moving picture cameras are known, they, in general, include relatively costly and delicate parts which, for economic reasons, can not be incorporated in a low-cost amateur motion picture camera. According to my invention, I provide a simple device costing but a few cents which may either be applied to existing cameras or may be incorporated in the course of manufacture of cameras.

Referring to Figures 1, 2, and 3, a conventional amateur motion picture camera 10 is illustrated as comprising a lens housing 12 having a portion 14 which is secured to the camera proper by threads or the like, and having a rotatable iris-adjusting barrel portion 16 which rotates not only with respect to the part 14, but with respect to the outer end portion 18 of the lens housing. In accordance with my invention, the outer end portion 18 is provided with a groove 20 to receive the radially inwardly extending rib 22 of a resilient C-shaped ring 24. The ring 24 is sufficiently resilient that it grips the end portion 18 of the lens housing with sufficient friction that it will not be shifted except when it is intentionally rotated by hand. It is, however, sufficiently freely mounted upon the end portion 18 that its position thereon may be readily pre-set for purposes appearing hereinafter.

A stop projection 26 illustrated in the form of a pin driven into the enlarged knurled portion of the rotatable iris-adjusting barrel is provided for engagement with the ends of the C ring 24.

In the taking of a scene, the iris-adjusting barrel 16 is rotated to the desired position of adjustment as in Figure 2, illustrated as an opening at f8. The C ring 24 is then adjusted to the position in which it is shown in Figures 2 and 3, with its end surface 30 in abutment with the pin 26. The simplest method of accomplishing this adjustment is first to bring the end surface 30 into engagement with the pin 26 and then adjust the aperture controlling barrel 16 to the desired aperture position by rotating the latter counterclockwise (Fig. 3). In this way the pin 26 will move the C ring 24 to the proper position as an incident to the adjustment of the iris aperture. Having thus adjusted the position of the C ring 24, the iris aperture controlling barrel 16 is rotated clockwise (Fig. 3) to the position in which the iris aperture is of minimum diameter. The photographer will then commence taking the picture by proper control of the motion picture camera, and during the initial portion of the scene will gradually move the iris-adjusting barrel 16 counterclockwise (Fig. 3) until the pin 26 abuts against the end face 30 of the C ring 24. The friction between the C ring 24 and the lens housing 18 will be sufficient so that when the pin 26 strikes the end of this C ring the latter will prevent further opening movement of the iris, except by the application of a greatly increased force. Thus the iris aperture may be gradually increased to the desired size at which the scene is to be photographed and the photographer will readily sense when the pin 26 abuts against the surface 30 and discontinue rotation of the iris-adjusted barrel 16. When the photographer has substantially completed photographing the desired scene, he will, prior to discontinuing operation of the camera, gradually rotate the iris-adjusted barrel 16 clockwise (Fig. 3) until the barrel is arrested by the stop which is provided for preventing damage to the iris as the iris reaches its minimum diameter.

It will thus be apparent that in the use of the simple C ring construction the photographer has at his disposal a means for producing "fade-in" and "fade-out" effects with great facility.

In Figures 4 and 5 is illustrated a slightly modified form of my invention in which the split C ring 34 is mounted upon the rotatable iris-adjusted barrel 16, being in frictional engagement therewith, and has its end faces cooperable with a pin 36 driven into the fixed lens housing 14. The operation of this modified form of invention is substantially identical with that of the construction shown in Figures 1, 2, 3, the main difference residing in the fact that the adjustable C ring is mounted upon the movable barrel instead of upon a fixed portion of the lens housing.

In Figures 6 and 7 there is illustrated a further modification of my invention which in principle of operation is identical with the construction shown in Figures 1, 2, 3, but which is of such construction that it may readily be applied to a lens and iris assembly not initially designed for its use. In this construction the split resilient C ring 38 has a cross section in which the inner surface is V-shaped and is cooperable either with a V-shaped annular groove, or with a rectangular groove formed in the lens housing portion 18. The stop means mounted upon the iris-adjusting barrel 16 consists of a stamping 40 having a plurality of resilient lugs 42 which tightly grip the knurled portion 17 of the iris-adjusting barrel 16, and has a sidewardly projecting stop lug 44 which is engageable with the end surfaces of the C ring 38. For convenience of manipulation, the stamping 40 is provided with a radially extending lever or handle 46. By the use of this lever or handle the rotation of the barrel 16 may be more easily and smoothly controlled by the photographer, so as to make the "fade-in" and "fade-out" of the resultant picture very gradual without sudden changes as might result from a jerky rotation of the iris-adjusting barrel 16.

The operation of the modified form of the invention shown in Figures 6 and 7 will be substantially the same as that of the construction shown in Figures 1, 2, and 3.

In all of the forms of my invention disclosed herein, the desired "fade-in" and "fade-out" of a scene upon the motion picture film may be readily obtained with the addition of but two small parts to the lens and iris housing. Thus at a very small expense an amateur motion picture camera may be equipped with "fade-in" and "fade-out" means effective to produce results formerly obtainable only by the use of the more expensive amateur motion picture cameras and by the use of professional cameras.

While I have disclosed several forms of my invention, it will be apparent to those skilled in the art that numerous further modifications and variations thereof may be made without departing from its underlying principle. I therefore desire to include within the scope of the accompanying claims all such similar constructions whereby substantially the same results of my invention may be obtained by substantially the same means.

I claim:

1. In a device for facilitating the production of "fade-in" and "fade-out" effects with motion picture cameras of the type having a lens housing and an iris-adjusting element movable with respect to said housing, the combination of a stop fixed to said housing, and a unitary member adjustably secured to said iris-adjusting barrel and having spaced stop faces cooperable with said stop whereby said iris-adjusting member may readily be moved from its position of minimum aperture to any desired aperture opening determined by the adjustment of said member and again moved to the position determining the minimum aperture.

2. In a motion picture camera, the combination of a lens housing having a groove formed therein, a split spring ring having a portion fitting in said groove and resiliently held in position on said housing, an aperture adjusting member movable with respect to said housing, and a stop secured to said aperture adjusting member and cooperable with the ends of said split ring thereby to limit the extent of the aperture opening movement of said element.

3. In a motion picture camera, the combination of a lens housing, an iris-adjusting member movable with respect to said housing, a unitary stop element adjustably secured to said member and having a pair of stop faces, and a cooperating stop secured to said housing and engageable with the stop faces of said element.

4. In a motion picture camera, the combination of a lens housing, an iris adjusting member rotatable with respect to said housing, and cooperating adjustable means on said housing and said member to limit the extent of aperture increasing movement of said member, said stop means comprising a projection of relatively small angular width secured to one of said elements, and a split spring ring adjustably secured to the other of said elements, said ring resiliently and frictionally engaging said last named element and being angularly adjustable with respect thereto.

IRWIN E. MATHER.